March 14, 1944.  C. F. CRUMB ET AL  2,344,235
CORN SHELLER
Filed Feb. 10, 1941  2 Sheets-Sheet 1

Inventors
Charles F. Crumb
Eugene F. Schneider
By Paul O. Pippel
Att'y.

March 14, 1944.　　C. F. CRUMB ET AL　　2,344,235
CORN SHELLER
Filed Feb. 10, 1941　　2 Sheets-Sheet 2
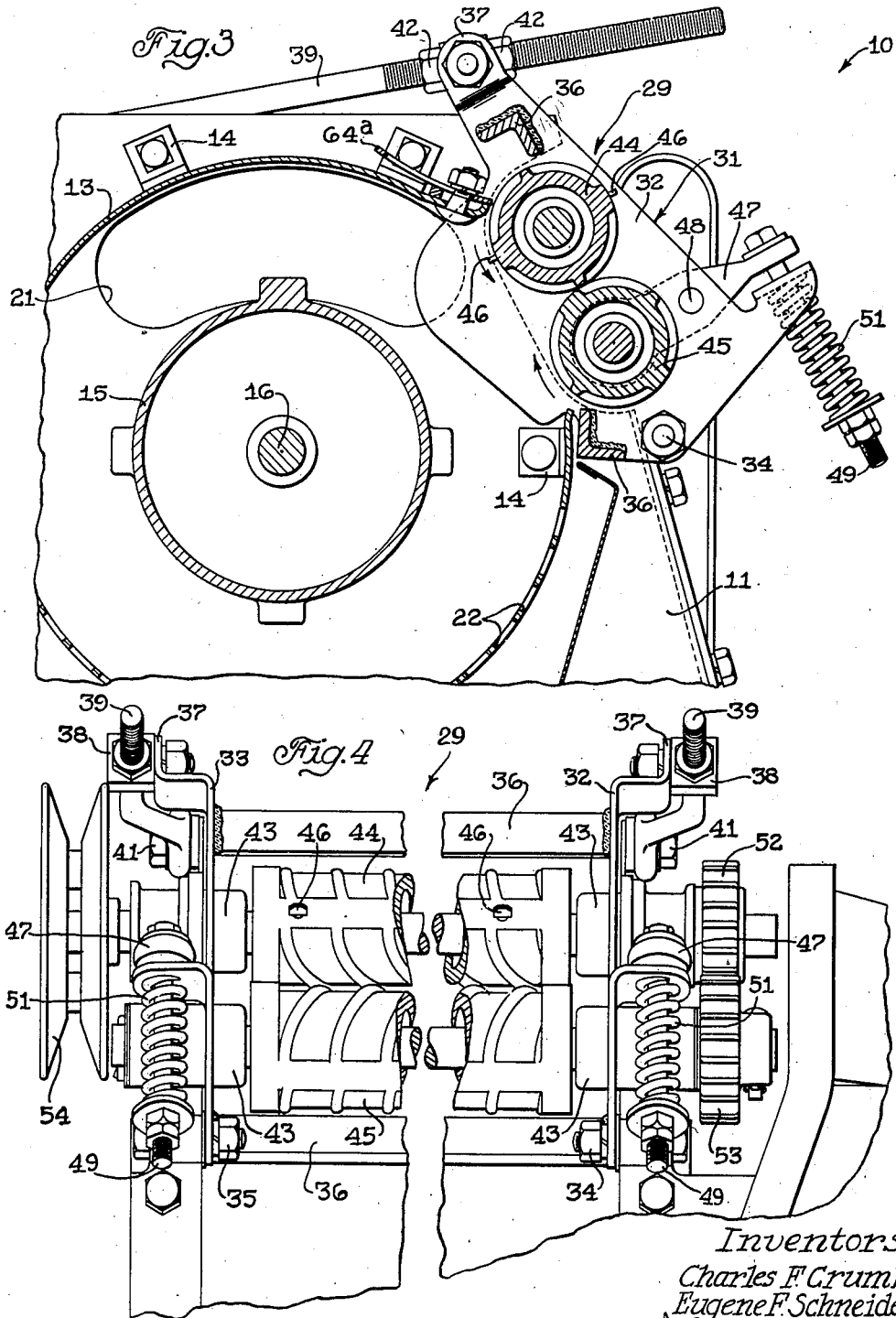
Inventors
Charles F. Crumb
Eugene F. Schneider
By Paul O. Pippel
Att'y.

Patented Mar. 14, 1944

2,344,235

UNITED STATES PATENT OFFICE 2,344,235

CORN SHELLER

Charles F. Crumb, Chicago, and Eugene F. Schneider, Evanston, Ill., assignors to International Harvester Company, a corporation of New Jersey Application February 10, 1941, Serial No. 378,222

5 Claims. (Cl. 130—6)

The present invention relates to corn shellers, and more particularly it relates to a husk removing means therefor.

Many times in harvesting corn the ears of corn are snapped from the stalks, but the husk is not removed. The corn, with the husk left on, is then stored in any suitable place. When it is desired to shell the corn, the present day corn shellers do not efficiently shell corn that has not been husked.

With this point in mind, it is an important object of the present invention to provide an improved corn sheller which will efficiently shell corn that has not been husked.

Another object of the present invention is to provide a novel husk removing means for a corn sheller.

Another object of the present invention is to provide a manually adjustable means for adjusting the husk removing means on the corn sheller.

Another object of the present invention is to provide a novel rotary husk and trash removing means for a small cylinder type sheller.

According to the present invention, the sheller cage of the sheller is provided with an opening with which is associated a husk removing means, which comprises a frame having a pair of rolls. The frame is pivotally mounted on the sheller adjacent the opening in the shelling cage. A manually adjustable member is connected to the corn sheller and to the frame carrying the rolls in such a manner that the rolls may be adjusted toward and away from the opening in the shelling cage. The rolls are adapted to be driven from an operative part of the sheller so as to remove the husks that collect within the shelling cage.

Other objects and advantages of the present invention will become apparent when viewed in the light of the detailed description to follow, taken in conjunction with the accompanying drawings, in which:

Figure 3 is a sectional view taken along the line 3—3 of Figure 2, and shows the location of the husk removing means with respect to the shelling cage; and, Figure 4 is an enlarged side view of the mounting for the husk removing means.

Figure 1:
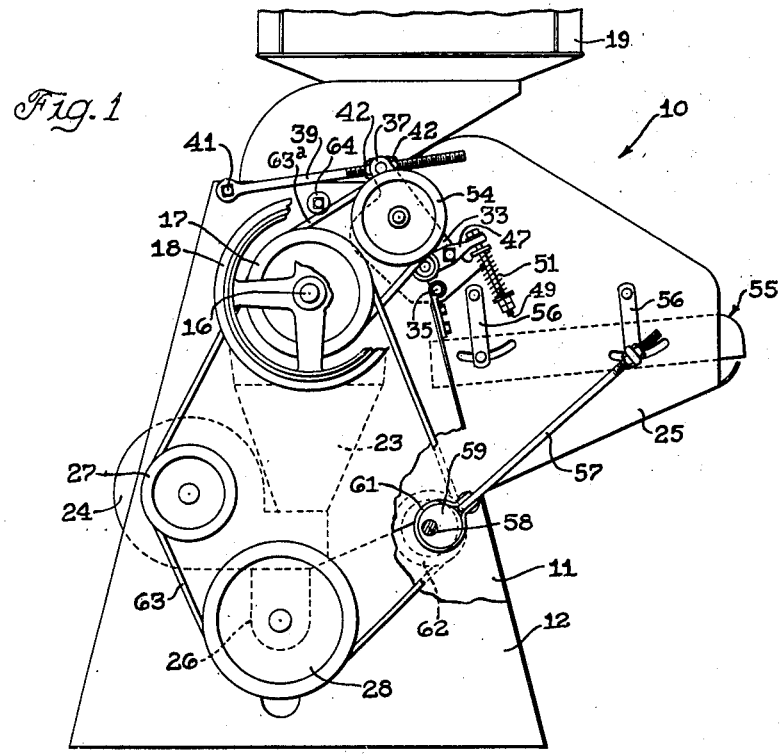
Figure 1 is an end view of a corn sheller upon which is mounted the novel husk removing means.
Figure 2:
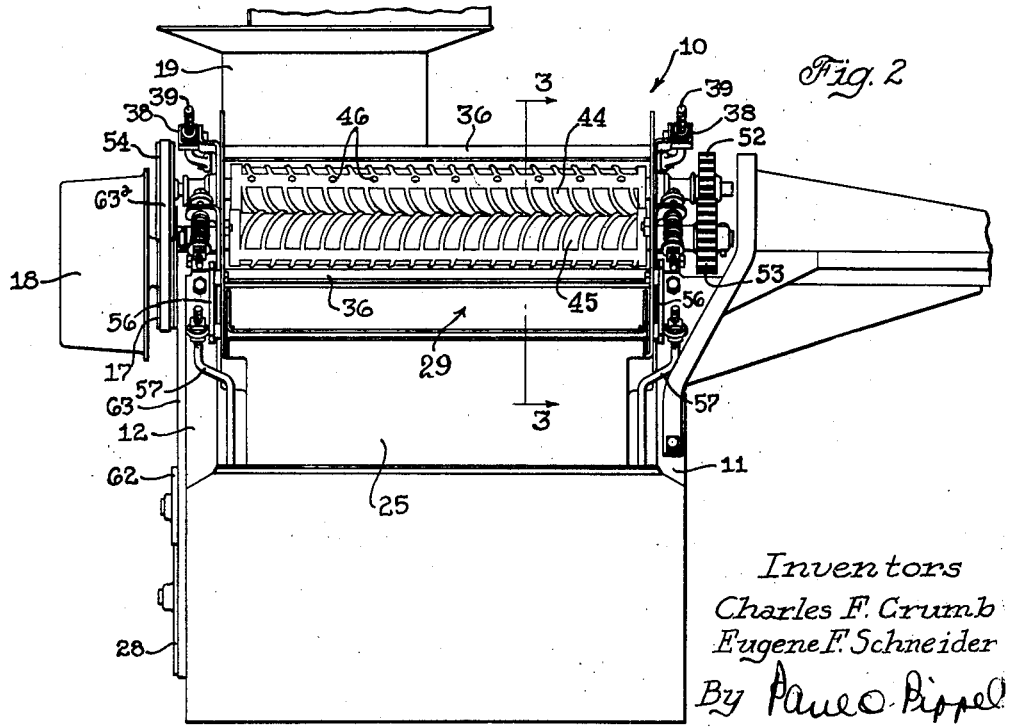
Figure 2 is a side view of the sheller shown in Figure 1.

Referring to Figures 1 and 2, there is shown a corn sheller 10 which consists of end plates 11 and 12 that constitute the frame for the sheller. A sheller cage 13, disposed on a horizontal axis, is provided between the end plates 11 and 12 and is secured thereto by means of brackets 14. A shelling cylinder 15 secured to a shaft 16 is journaled within the shelling cage 13 in suitable bearings provided in the end plates 11 and 12. As shown in Figure 1, the end of the shaft 16 projects beyond the end plate 12, and pulleys 17 and 18 are secured thereto. A belt may be trained around the pulley 18 and any suitable source of power for driving the various parts of the sheller. The drive for the various parts of the sheller is taken from the multiple type pulley 17, which is a two belt type pulley. At the top and near one end of the shelling cage is provided an opening with which is associated the usual feed hopper 19. The corn to be shelled is put in the feed opening 19 from which it falls into the shelling cage 13. In the end plate 11, between the inner surface of the shelling cage and the outer surface of the shelling cylinder 15, is provided an opening 21 through which the cobs of the shelled corn are ejected. The lower portion of the shelling cage 13 is provided with the usual openings 22 through which the shelled corn falls into a hopper 23. A fan 24 directs a blast of air through the shelled corn, thence upward through a screen, and a portion of the air out through a discharge chute 25. The shelled corn then falls from the hopper 23 into a trough 26 from which the corn may be conveyed by any suitable conveying mechanism, not shown. As shown in Figure 1, a pulley 27 is provided on the fan shaft, and a pulley 28 is provided on the auger shaft that is mounted within the trough 26.

Referring now to Figure 3, it is to be noted that an opening is provided by cutting away a portion of the shelling cage 13. Adjacent this opening is mounted the novel husk removing means 29.

The husk and trash removing means 29 comprises a frame 31 which consists of a pair of plates 32 and 33 which are pivotally connected to the end plates 11 and 12, respectively, by bolts 34 and 35. The plates 32 and 33 are held in spaced relation by a pair of angle bars 36, the ends of which are welded to the plates 32 and 33. A portion of the plates 32 and 33 extends upwardly into a portion 37 in which is mounted an eye bolt 38. A rod 39 is secured to each of the end plates 11 and 12 by a bolt 41. The end of the rod 39 is provided with threads and is inserted within the eye bolt 38. Nuts 42 are provided on the threaded end of the rod 39 at each side of the eye bolt 38. By this construction the husk removing means 29 may be moved toward or away from the opening in the shelling cage 13 about the pivot bolts 34 and 35.

The plates 32 and 33 are provided with alined openings in which are secured bearings 43 in which are journaled a pair of husk removing rolls 44 and 45. The outer periphery of the rolls 44 and 45 is provided with a grooved surface. Pins 46 also project from the outer periphery of the rolls. As shown in Figure 3, the bearings 43 for the roll 45 are carried in the brackets 47 which are pivotally connected to the brackets 32 and 33 by bolts 48. A bolt 49 having a spring 51 mounted thereon passes through alined openings in the brackets 47 and the plate members 32 and 33. By this particular construction the roll 45 may move clockwise or counter-clockwise about the pivot bolt 48 against the tension of the spring 51. As shown in Figure 4, a gear 52 is provided at the end of the roll 44 which is adapted to mesh with a gear 53 that is provided at the end of the roll 45. By this gear arrangement the rolls are driven in the direction of the arrows as indicated in Figure 3. At the other end of the roll 44 is mounted a pulley 54.

When the corn sheller is in operation, corn is put in the hopper 19 from which it falls into the shelling cage 13. The corn may be husked or not husked; in either event, the shelling cylinder 15 acts on the corn and removes the husk and the corn from the cob; the shelled corn falls through the openings 22 in the lower portion of the shelling cage 13, and the cobs pass out through the opening 21 in the end plate 11. It will be obvious when the corn that is not husked is shelled in the sheller, a great amount of the husks will be retained within the shelling cage, since they will be all interconnected and mashed together. In this case the husk removing means efficiently removes the husks from the shelling cage. Obviously the husks and the cobs with the husks remaining thereon are thrown tangentially by centrifugal force from the shelling rotor 15 directly to the juncture of the pair of rotary husk- and trash-removing rolls 44 and 45 which are positioned substantially tangentially on the circumference of the cylindrical shelling cage 13. Since the rolls are driven, the husks are pulled by the rolls out of the shelling cage onto a reciprocating table 55, which is pivotally mounted on a suitable structure provided on one side of the sheller 10. The table 55 is pivotally connected to a pair of links 56 which are in turn pivotally connected to the side sheets of the discharge chute 25. A rod 57 is connected to one of the links 56 at each side of the discharge chute 25 and extends downwardly to a shaft 58 which is journaled in the end plates 11 and 12. Cams 59 are provided on the shaft 58, and the ends of the rods 57 are connected to the cams 59 by straps 61. A pulley 62 is mounted at the end of the shaft 58. A suitable belt 63 is trained around the pulleys 17, 27, 28, and 62 to drive the same. As the husks fall onto the reciprocating table 55, the shelled corn discharged with the husks is fed back into the trough 26 and the husks are ejected off the end of the table 55. A suitable belt 63a is trained around the pulley 17 and the pulley 54 so as to drive the rolls 44 and 45. A belt tightener 64 is associated with the belt 63, which compensates for the slack in the belt, in the event the husk removing means 29 is adjusted toward or away from the opening in the shelling cage 13 by adjusting the nuts 42 on the rods 39. This adjustment is sometimes valuable, because many times, the corn has a heavy husk in which case the rolls are moved inwardly, and sometimes the corn has a light husk in which case the rolls are moved outwardly. In the event the rolls are moved outwardly, a plate 64a provided at the upper edge of the shelling cage 13 is moved toward the upper roll 14. The rolls 44 and 45 may be used in the following combinations: Two iron rolls having pins may be used in extreme conditions, or two rubber rolls may be used, or a rubber and an iron roll may be used depending on the condition of the corn when it is to be shelled.

From the foregoing description it should be apparent that a simple and novel husk removing means has been provided for a cylinder type corn sheller. The husk removing means may be adjusted to meet all conditions and efficiently removes the husks from within the shelling cage.

While various changes and modifications may be made in this structure disclosed, it is to be understood that the invention is to be limited only within the terms of the appended claims.

What is claimed is:

1. In a corn sheller, a pair of end plates, a cylindrical shelling cage for shelling kernels from ears, some of which may include husks, said cage having an opening; means connecting the cage to the end plates; a shelling cylinder within the shelling cage; means for driving the shelling cylinder; means for discharging kernels separate from husks; a frame attached to the end plates near the opening in the shelling cage; a pair of cooperating rolls journaled on said frame and positioned substantially tangentially on the circumference of said cage and adapted to engage and remove husks from the cage; and means for driving said rolls from said shelling cylinder.

2. In a corn sheller for shelling ears of corn, some of which may include husks: a pair of spaced end plates; a stationary shelling cage having an opening and arranged on a horizontal axis and secured to the end plates; a shelling cylinder journaled within the shelling cage; means for the discharge of shelled kernels separate from husks; means for driving the shelling cylinder to shell the kernels from the cobs of corn and to discharge said kernels out of the cage separate from husks; a pair of cooperating rolls arranged on parallel horizontal axes adjacent the opening in the shelling cage and journaled in said end plates in such a manner that portions are approximately within the shelling cage and adapted to directly receive husks centrifugally thrown by the shelling cylinder proximately positioned in the cage; and means for rotating said rolls from the shelling cylinder in such a manner that the rolls will engage and pull husks from the shelling cage.

3. In a corn sheller for shelling ears of corn, some of which may include husks: a pair of spaced end plates; a stationary shelling cage secured to said end plates having an opening in an upper portion thereof and a multiple apertured bottom arranged on a horizontal axis; a shelling cylinder journaled within the shelling cage whereby shelled kernels are discharged separately from husks through said apertured bottom; means for driving the shelling cylinder to shell the kernels from the cobs of corn and to discharge said kernels out of the cage separate from husks; a pair of cooperating husk- and trash-removing rolls arranged horizontally adjacent the opening in the shelling cage, one of said rolls being journaled in said end plates, said other roll being movably mounted in said end plates so that it may move toward or away from the first-mentioned roll; and means for driving and husk- and trash-removing rolls in such a manner that at least one of the rolls will engage husks in the cage so that said rolls will pull husks from the cage.

4. In a corn sheller for shelling ears of corn, some of which may include husks: a pair of spaced end plates; a stationary shelling cage having an opening and arranged on a horizontal axis and secured to the end plates; a shelling cylinder journaled within the shelling cage; means for the discharge of shelled kernels separate from husks; means for driving the shelling cylinder to shell the kernels from the cobs of corn and to discharge said kernels out of the cage separate from husks; a pair of cooperating husk- and trash-removing rolls arranged horizontally adjacent the opening in the shelling cage and adapted to engage husks in the cage, one of said rolls being journaled in said end plates, said other roll being yieldingly movably mounted in said end plates so that it may move toward or away from the first-mentioned roll, and means for driving one of said rolls from the shelling cylinder whereby the rolls will pull husks from the shelling cage.

5. In a corn sheller: the combination of means for shelling corn, including a shelling cage, a shelling rotor adapted to shell kernels from ears of corn, some of which ears may include husks, said cage including an opening and a foraminous bottom for the discharge of kernels separate from husks and cobs; means comprising a pair of cooperating husk- and trash-removing rolls positioned for rotation toward each other adjacent the opening in the shelling cage and adapted to directly receive husks and trash centrifugally thrown by said shelling rotor on a line tangent from the circumference of said rotor to remove said husks and trash from the cage.

CHARLES F. CRUMB.
EUGENE F. SCHNEIDER.